United States Patent
Player

(10) Patent No.: US 8,200,732 B2
(45) Date of Patent: Jun. 12, 2012

(54) APPARATUS AND METHOD FOR CALCULATING AND VISUALIZING TARGETS

(75) Inventor: Michael Gary Player, Congleton (GB)

(73) Assignee: Business Objects Software Ltd, Dublin (IE)

(*) Notice: Subject to any disclaimer, the term of this patent is extended or adjusted under 35 U.S.C. 154(b) by 1277 days.

(21) Appl. No.: 11/849,172

(22) Filed: Aug. 31, 2007

(65) Prior Publication Data

US 2009/0063598 A1 Mar. 5, 2009

(51) Int. Cl.
*G06F 7/38* (2006.01)

(52) U.S. Cl. .................................. 708/446

(58) Field of Classification Search .............. 708/446
See application file for complete search history.

(56) References Cited

U.S. PATENT DOCUMENTS 7,461,040 B1 * 12/2008 Goldman et al. .......... 706/45

* cited by examiner

*Primary Examiner* — Tan V. Mai

(74) *Attorney, Agent, or Firm* — Mintz, Levin, Cohn, Ferris, Glovsky and Popeo, P.C.

(57) ABSTRACT

A computer-readable medium includes executable instructions to define a target value, define an achievement boundary range, define specific values for the achievement boundary range, and combine the target value, achievement boundary range, and specific values associated with the achievement boundary range to form an absolute target metric object.

15 Claims, 4 Drawing Sheets

APPARATUS AND METHOD FOR CALCULATING AND VISUALIZING TARGETS

BRIEF DESCRIPTION OF THE INVENTION

The present invention relates generally to analyzing data. More particularly, the present invention relates to a technique for determining and visualizing the relationship between a value and an absolute target.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used business intelligence and report generation products, including Crystal Reports™, Crystal Xcelsius™, and BusinessObjects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a presentation document, and the like.

Dashboards provide the user with a graphical user interface that enables a user to see key data items A dashboard may be defined such that an individual can use the dashboard to track metrics associated with performance objectives. In this way, a dashboard can provide charts, gauges, traffic light visualizations and alerts that provide a quick summary of the degree to which performance goals are being met.

A report document may provide a similar interface to the underlying data as a dashboard. A report document is generally created by a specialized tool including executable instructions to access data and format it. A report document where the content does not include external data, either saved within the report or accessed live, is a template document for a report rather than a report document. Unlike other non-report documents that may optionally import external data within a document, a report document by design is primarily a medium for accessing, formatting, and presenting external data.

A report design tool contains executable instructions specifically designed to facilitate working with external data sources. In addition to instructions regarding external data source connection drivers, these instructions may include advanced filtering of data, instructions for combining data from different external data sources, instructions for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. Spreadsheet applications work within a looping calculation model, whereas report generation tools may support a range of calculation models. Although there may be an overlap in the function of a spreadsheet document and a report document, the applications used to generate these documents contain instructions with different assumptions concerning the existence of an external data source and different logical approaches to interpreting and manipulating imported data.

The present invention relates to the analytical, performance management, and reporting aspects of BI. Performance metrics have become increasingly valuable and complex as they address requirements to analyze and measure the achievements of an individual, business unit, corporation, industry and the like. It is common for companies to set targets based on a performance trend where they wish to achieve the target or to achieve a target value point further on the same trend continuum as the target value. For example, a company may have a sales target result of 10 million where achieving that goal is 100% success and following the trend of maximizing achieving a result of 12 million is 120% success. Similarly there may be a cost target result of 10 million where achieving that cost target is 100% success and following the trend of minimizing a result of 8 million is 120% success. However, there are also many business cases where a target result is an absolute target rather than a target with a maximizing or minimizing trend. Maintaining headcount on a project or a stock level in a warehouse are common examples where there are disadvantages associated with not hitting the target in the case where the actual value is either greater or lesser than the absolute target value. Absolute targets also pose a challenge when they are included in aggregate measures and are combined with other measures with maximizing or minimizing success percentages.

Therefore, it would be desirable to provide a mechanism for measuring center values as percentage achievements. In particular, it would be desirable to provide a method to measure center values as percentage achievements such that they support asymmetrical boundary conditions and such that center values can be aggregated into other percentage calculations for achievement.

SUMMARY OF THE INVENTION

The invention includes a computer-readable medium with executable instructions to define a target value, define an achievement boundary range, define specific values for the achievement boundary range, and combine the target value, achievement boundary range, and specific values associated with the achievement boundary range to form an absolute target metric object.

The invention also includes a computer-readable medium with executable instructions to receive a target value for an absolute target metric, receive an achievement boundary range, receive specific values for achievement boundary ranges, and receive an actual value for the absolute target metric. The specific boundary range values lines crossed between the absolute target metric target value and the actual value for the absolute target metric are calculated. A percentage placement for the actual value within the boundary range is calculated. An overall percentage placement value for the actual value is calculated. A value representing the relationship between the target value and the actual value is returned.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
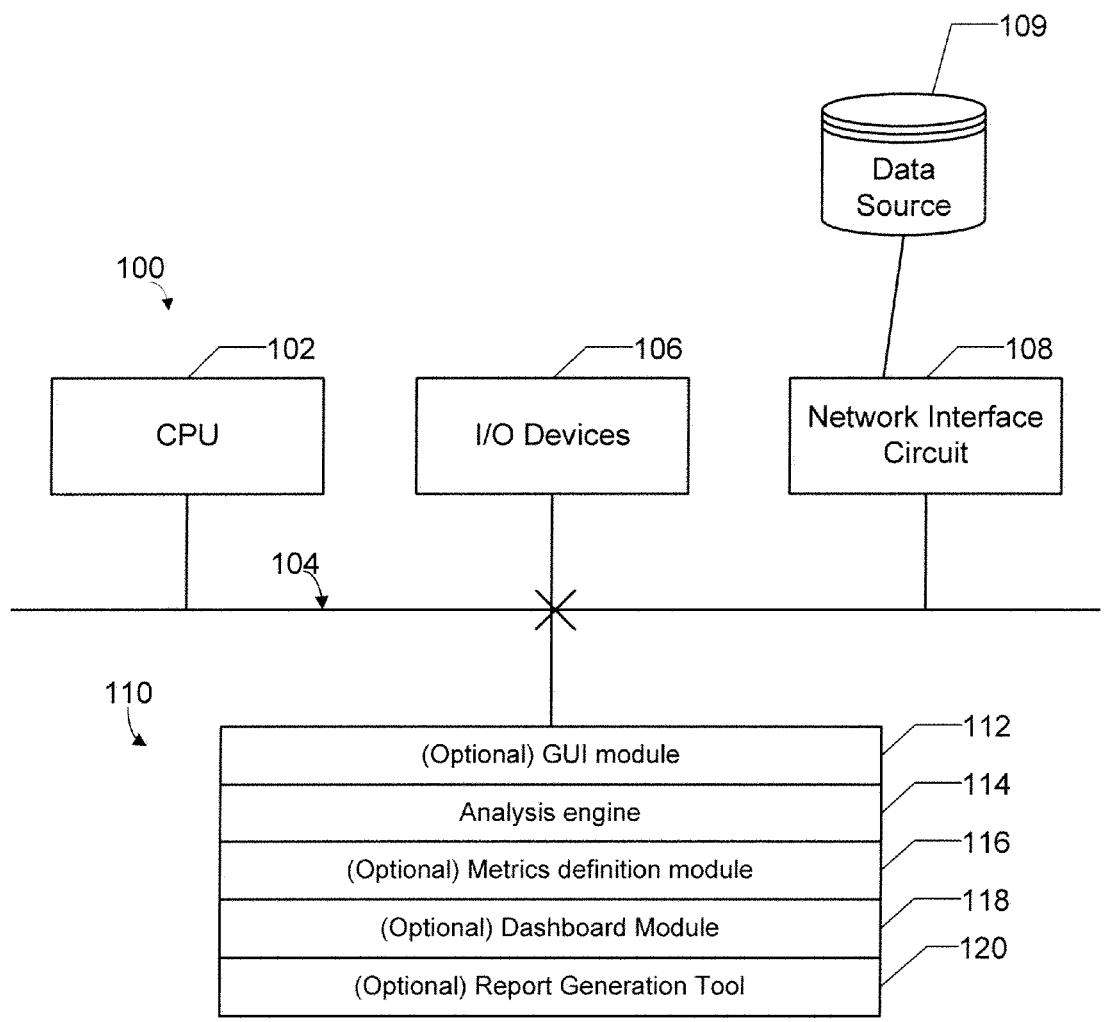
FIG. 1 illustrates a computer that may be operated in accordance with an embodiment of the invention.

FIG. 1 illustrates a computer 100 that may be operated in accordance with an embodiment of the invention. In the present embodiment of the invention, the computer 100 is a server computer including conventional server computer components. As shown in FIG. 1, the computer 100 includes a Central Processing Unit ("CPU") 102 that is connected to a network interface circuit 108 and a set of input/output devices 106 (e.g., a keyboard, a mouse, a display, a printer, a speaker, and so forth) via a bus 104. The network interface circuit connection device 108 is connected to a network which may be any wired or wireless transport medium. In one embodiment, the network interface circuit provides a connection to an external data source 109.

The CPU 102 is also connected to a memory 110 via the bus 104. The memory 110 stores a set of executable programs. One executable program is the analysis engine 114. The analysis engine 114 includes executable instructions to access a data source to produce a metric value. By way of example, the data source may be data source 109 accessed through Network Interface Circuit 108. The data source may be located anywhere in the network or within memory 110. A metrics definition module 116 facilitates setting custom values that are associated with achievement ranking percentages.

As shown in FIG. 1, the memory 110 also contains an optional dashboard module 118. The dashboard module provides an application that displays the results of the analysis engine's assessment of the percentage achievement for the metrics in a visual manner. The report generation tool 120 optionally works in conjunction with the analysis engine to generate report type documents that include the analysis engine results when assessing the percentage achievement of metrics. Other modules, such as, a graphical user interface module (GUI) 112 may exist in memory 110.

The executable modules stored in memory 110 are exemplary. Other modules could be added. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
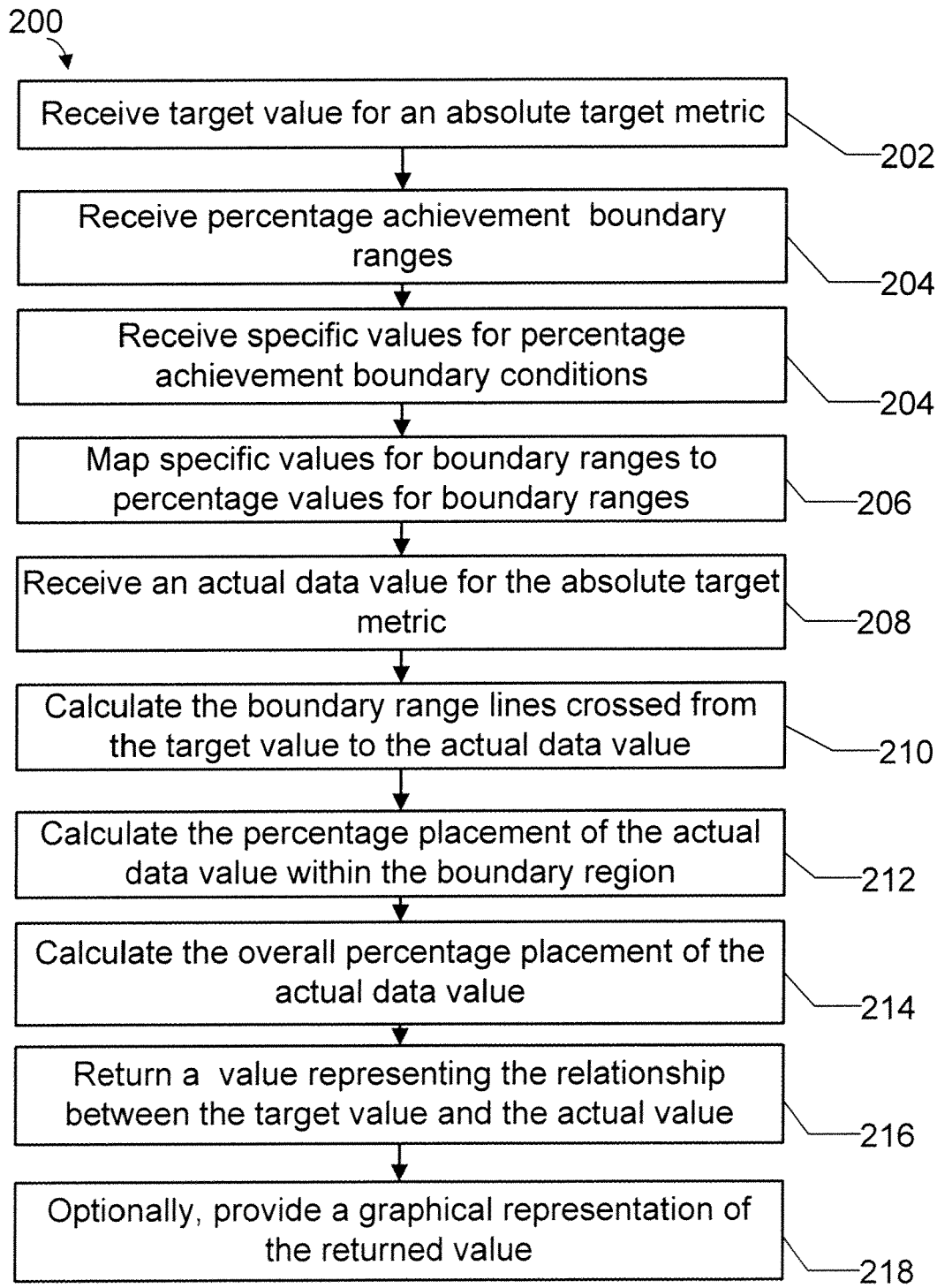
FIG. 2 illustrates processing operations associated with an embodiment of the invention.

The processing operations 200 shown in FIG. 2 generate a percentage achievement value for an actual data value with respect to an absolute target metric value. Optionally, the percentage achievement value is graphically represented. An absolute target metric is one where a maximizing or minimizing trend is not desirable but rather the achievement of a specific value or value range is the desirable achievement target. The first step in process 200 is to receive a target value for an absolute target 202. The target value specifies a numeric value that represents complete, ideal or 100% achievement for the metric. The target value can be specified as a single value, for example 250, a range of values 245-255, or an acceptable range of variance for example 1% (where in the example of a target of 250 acceptable values would be within the range 247.5-252.5), and the like. The value associated with an absolute target metric will be specific to a business goal or practice and the evaluation of acceptable performance levels within that context.

Receive percentage achievement boundary ranges 204 occurs when percentage indicate thresholds to which achievements will be mapped. Any number of boundary condition percentage ranges can be specified and the boundary condition percentage ranges need not be symmetrical in any way. The boundary conditions need not be symmetrical between the boundary conditions that are lesser or greater than the absolute target value, or within the segments on a given side of an absolute target value. Receive specific values for percentage achievement boundary conditions 204, provides the actual data values that are mapped to the percentage values for boundary ranges 206.

The specific values that are mapped to the percentage achievement boundary conditions are designed to reflect specific business scenarios which affect a given absolute target metric. For example, the specific values associated with the percentage achievement boundary conditions may be defined asymmetrically based on differing business risk/loss associated with the achievement of different actual data values. For example, it might be fairly low risk to have an excess or shortfall of up to 20%, but beyond this point, it might be much more expensive to maintain an excess of stock than to experience the downside risk of potentially not having appropriate levels of stock on the short term to cover a higher demand. In this case, if there was an absolute target of 250 units, both the values 200 and 275 could represent 75% achievement of the goal, and the values 50 and 300 could represent 50% achievement of the goal. In this way, the absolute target metric can use asymmetry to accurately represent the business risks which it is used to track.

The operation to receive an actual data value for the absolute target metric 208 provides the data value that is to be associated with the absolute target metric. The value received can reflect a value that has been achieved or forecasted. This value may be an input to a "what-if" type business evaluation.

The provision of values for the actual data value for the absolute target metric, the absolute metric target value, the percentage achievement boundary ranges percentages, and the percentage achievement boundary range values may be automatically provided by receiving the data from another process, reading from an existing data source, using configured values, receiving user input, a combination of the previous strategies, and the like.

The boundary range lines crossed from the target value to the actual data value are calculated 210. This includes calculating the segment in the boundary ranges which contains the actual data value. Because of the potential asymmetry of the boundary percentage ranges, the percentage placement of the actual data value within the boundary region is calculated 212. This is used to calculate the overall percentage placement of the actual data value 214 with respect to the absolute target value. These calculations are illustrated with regard to sample data in conjunction with FIG. 3. The value representing the relationship between the target value and the actual value is returned 216. Typically, this value is returned as a percentage achievement value. This value can optionally be graphically represented using standard graphical representation techniques such as a gauge, bar graph, pie chart, traffic light, alert and the like 218. The percentage value representing the achievement as it relates to the absolute target value metric can be combined with other metric values, including maximizing and minimizing trend metric values, to form composite metric values. These composite metric values can optionally be represented using standard graphical representation techniques.

Figure 3:
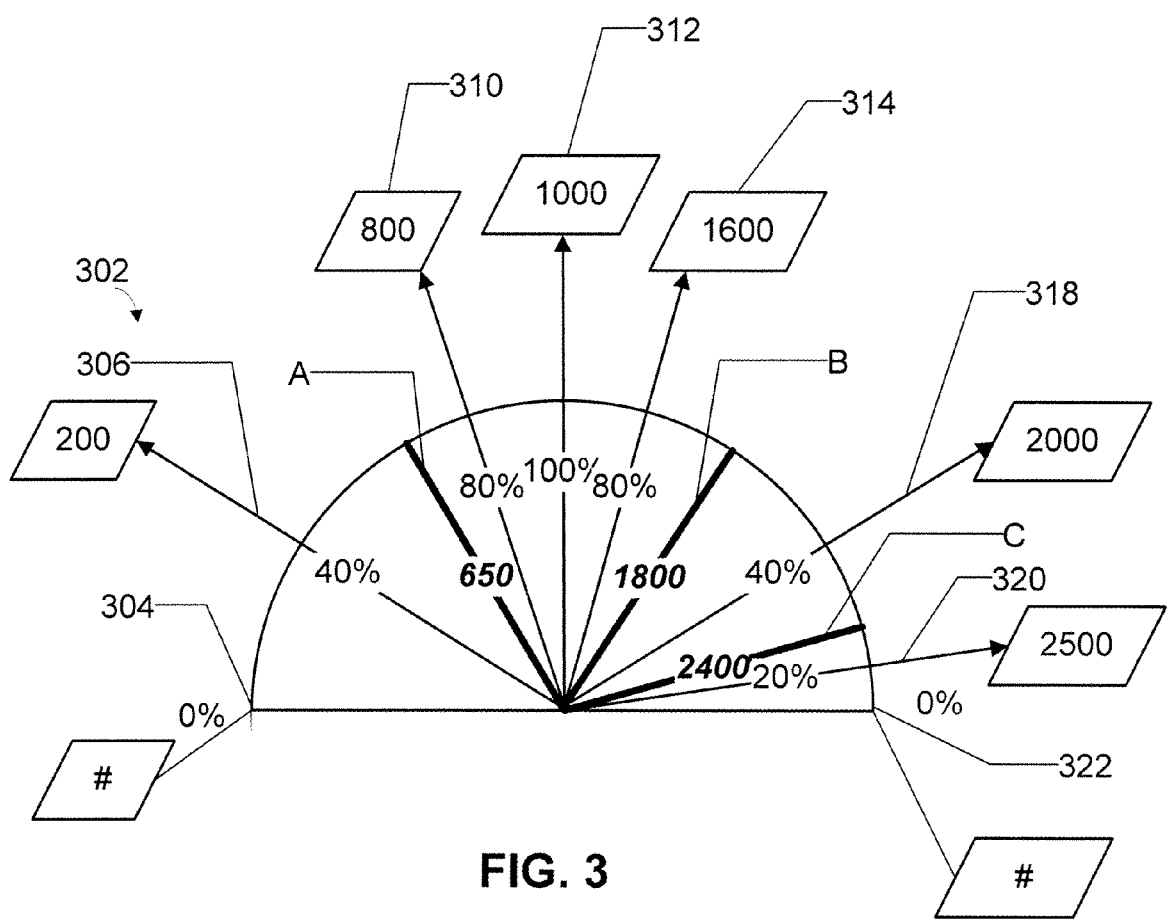
FIG. 3 provides an example using illustrative values associated with an absolute target, boundary conditions, and actual values in accordance with an embodiment of the invention.

FIG. 3 provides a graphical representation of underlying calculations and mappings with example data and mapping values. The graphical depiction of the calculations is used for the purposes of illustration; the calculations do not require graphical rendering within the system.

In FIG. 3 there is an absolute target value 312. This absolute target value is associated with complete or 100% achievement. A specific numeric value is associated with the absolute target value, for the purposes of example, the value specified is 1000. On either side of the absolute target value there are percentage achievement boundaries. For the purposes of example, there are 80% boundaries 310 and 314 and 40% boundaries 306 and 318 on either side of the absolute target value and a 20% boundary condition 320 the right of the absolute target value. Any number of percentage achievement boundaries associated with any percentage values can be associated with the absolute target value. Each of the percentage boundary conditions is associated with a value that is provided. Actual values for 0% achievement can be extrapolated from specified values, mapped to existing ranges for values that can be associated with the metric, specified by a process, specified through user interactions and the like.

The boundary conditions may be asymmetrical. For example, in FIG. 3 the 40% achievement below absolute target boundary condition 306 has been associated with the value 200 while the 80% achievement below absolute target boundary condition 310 is associated with the value 800. These boundaries are themselves not symmetrical, nor do they correspond in symmetry to the percentage boundary conditions for values that exceed the absolute target value where the 40% achievement condition 318 has been associated with the value 2000 and 80% achievement of the absolute target boundary condition 314 is associated with the value 1600.

Three example actual data values 650, 1800, and 2400 labeled as A, B, and C respectively have been illustrated to provide a demonstration of how the calculation model is applied to calculate the percentage achievements associated with various actual data values for the metric.

For example, the actual data value A (650) crosses a 80% boundary condition 310 and the achievement percentage relationship for A with respect to the target absolute value can be calculated as:

$$([310]-A)/([310]-[306])=x$$

$$x*([310\%]-[306\%])=y\%$$

$$[310\%]-y\%=\text{percentage achieved}$$

Or with the example values:

$$(800-650)/(800-200)=0.25$$

$$0.25*40=10\%$$

$$80\%-10\%=70\%$$

Similarly, the actual data value B (1800) crosses a 80% boundary condition 314 and the achievement percentage relationship for B with respect to the target absolute value can be calculated as:

$$([314]-B)/([314]-[318])=x$$

$$x*([314\%]-[318\%])=y\%$$

$$[314\%]-y\%=\text{percentage achieved}$$

Or with the example values:

$$(1600-1800)/(1600-2000)=0.5$$

$$0.5*(80-40)=20\%$$

$$80\%-20\%=60\%$$

Similarly, the actual data value C (2400) crosses a 40% boundary condition 318 and the achievement percentage relationship for B with respect to the target absolute value can be calculated as:

$$([318]-C)/([318]-[320])=x$$

$$x*([318\%]-[320\%])=y\%$$

$$[318\%]-y\%=\text{percentage achieved}$$

Or with the example values:

$$(2000-2400)/(2000-2500)=0.8$$

$$0.8*(40-20)=16\%$$

$$40\%-16\%=24\%$$

In the case of each of the example actual data values A B and C, respective percentage achievement values 70%, 60% and 24% are calculated. These values are returned by the analysis engine 114. Optionally, these values can be used in further calculations and/or can then be depicted using standard visualization techniques such as charts, gauges, traffic light visualizations and alerts.

Figure 4:
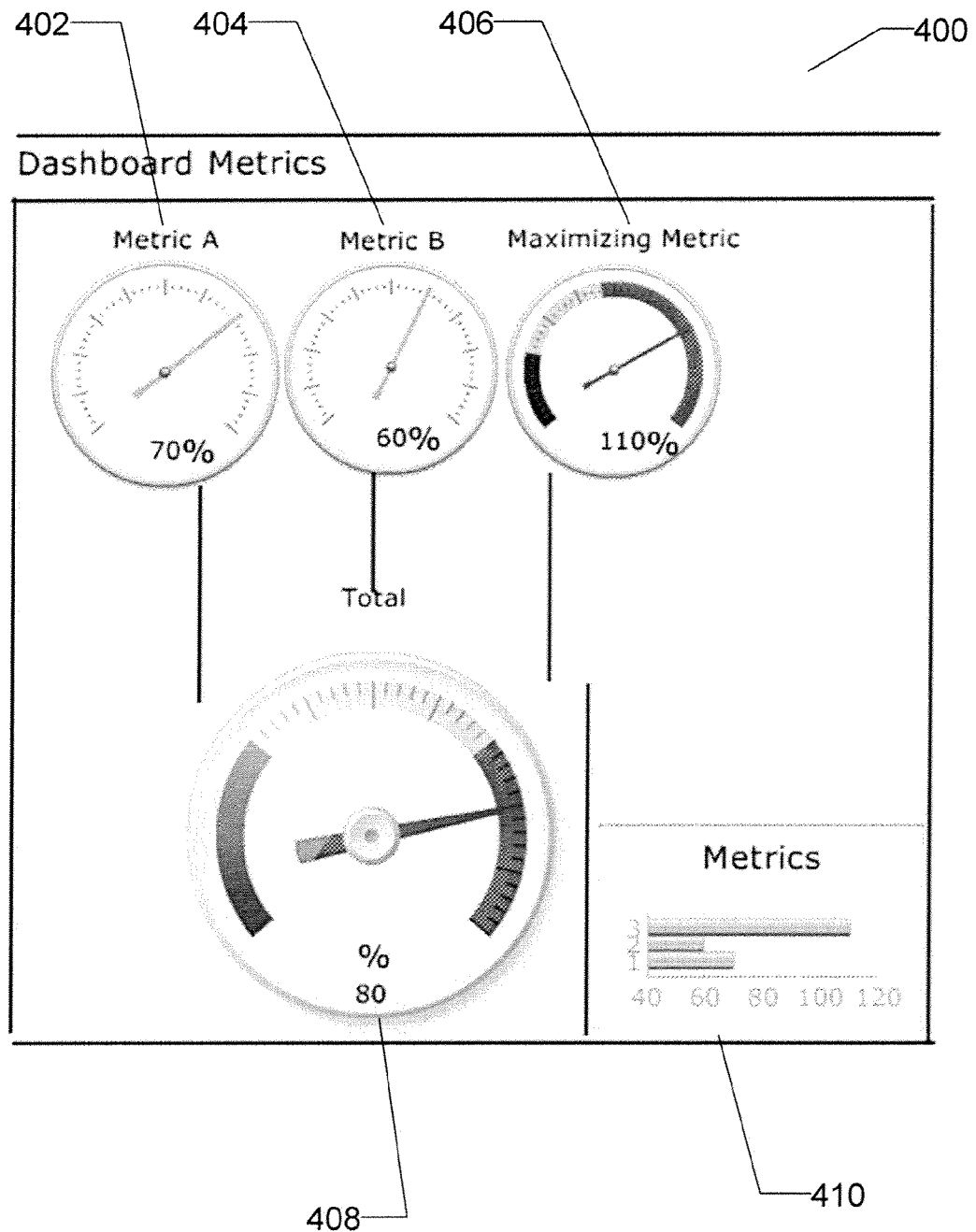
FIG. 4 illustrates an exemplary graphical user interface in accordance with an embodiment of the invention.

FIG. 4. illustrates an example of a dashboard GUI 400 containing percentage achievement values for Value A and Value B in FIG. 3 as Metric A 402 and Metric B 404 respectively. These metrics are combined with Maximizing Metric 406 in Total Metric 408. An additional chart visualization 410 containing values associated with metrics is also included in the dashboard. There are any number of ways of depicting percentage achievement values for absolute targets within dashboards, reports and other forms of data analytics. Any number of alert type chart displays including gauges, horizontal or vertical bar types, traffic lights and the like can be used to display percentage achievement values for an absolute target metric. Absolute target metrics can be combined with maximizing and minimizing metrics to provide composite metrics. Percentage achievement values can be provided based on forecasting techniques. These composite metrics can be calculated based on weighted aggregation, balanced scorecarding, conditional formulas and the like.

Herein, when introducing elements of embodiments of the invention the articles "a" "an," "the" and "said" are intended to mean that there are one or more of the elements. The terms "comprising", "including" and "having" are intended to be inclusive and to mean that there may be additional elements other than the listed elements.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer-readable medium storing instructions to cause at least one data processor to:
   receive a target value for an absolute target metric;
   receive an achievement boundary range;
   receive specific values, for achievement boundary ranges;
   receive an actual value for the absolute target metric;
   calculate the specific boundary range values lines crossed between the absolute target metric target value and the actual value for the absolute target metric;
   calculate a percentage placement for the actual value within the boundary range;
   calculate an overall percentage placement value for the actual value; and
   return a value representing the relationship between the target value and the actual value.

2. The non-transitory computer-readable storage medium of claim 1, wherein the executable instructions to receive the achievement boundary range include executable instructions to receive one or more boundary ranges associated with greater than 0% achievement on either side of the absolute target metric.

3. The non-transitory computer-readable storage medium of claim 2, wherein the executable instructions to receive specific values for achievement boundary ranges include executable instructions to define boundary conditions with asymmetrical values.

4. The non-transitory computer-readable storage medium of claim 1, wherein the executable instructions to receive a target value for an absolute target metric include executable instructions to define a finite range of values that match the absolute target metric.

5. The non-transitory computer-readable storage medium of claim 1, wherein the executable instructions to return a value representing the relationship between the target value and the actual value return a percentage achievement value.

6. The non-transitory computer-readable storage medium of claim 5, wherein the percentage achievement value is depicted using a graphical visual representation.

7. The non-transitory computer-readable storage medium of claim 6, wherein the graphical visual representation is selected from a chart visualization, a gauge visualization, a traffic light visualization and an alert visualization.

8. The non-transitory computer-readable storage medium of claim 5, wherein the percentage achievement value for an absolute target metric is combined with other metric values to generate an aggregated metric.

9. A non-transitory computer-readable medium storing instructions to cause at least one data processor to:
   define an absolute target value;
   define a plurality of percentage achievement values associated with the absolute target value;
   define a plurality of specific numeric values, each specific numeric value corresponding to one of the plurality of percentage achievement values; and
   combine the absolute target value, the plurality of percentage achievement values and the plurality of specific numeric values to form an absolute target metric object.

10. The non-transitory computer-readable storage medium of claim 9, wherein defining the absolute target value comprises defining the absolute target value as a finite range of values.

11. The non-transitory computer-readable storage medium of claim 9, wherein defining a plurality of percentage achievement values comprises defining one or more percentage achievement values associated with greater than 0% achievement on either side of the absolute target metric.

12. The non-transitory computer-readable storage medium of claim 11, wherein defining the plurality of specific numeric values comprises defining the plurality of specific numeric values with asymmetrical values.

13. The non-transitory computer-readable storage medium of claim 9, further including executable instructions to store and retrieve a target metric object.

14. The non-transitory computer-readable storage medium of claim 13, further including executable instructions to edit the target metric object.

15. The non-transitory computer-readable storage medium of claim 9, further including executable instructions to receive an actual data value for the absolute target value and calculate a percentage achievement value for the absolute target metric object.

* * * * *